United States Patent
Ramlall

(10) Patent No.: US 10,375,659 B1
(45) Date of Patent: Aug. 6, 2019

(54) WIRELESS BODY-AREA NETWORK TIME SYNCHRONIZATION USING R PEAK REFERENCE BROADCASTS

(71) Applicant: SPAWAR Systems Center Pacific, San Diego, CA (US)

(72) Inventor: Rohan Y. Ramlall, Brentwood, CA (US)

(73) Assignee: The United States of America as represented by Secretary of the Navy, Washington, DC (US)

(*) Notice: Subject to any disclaimer, the term of this patent is extended or adjusted under 35 U.S.C. 154(b) by 293 days.

(21) Appl. No.: 15/473,828

(22) Filed: Mar. 30, 2017

Related U.S. Application Data

(60) Provisional application No. 62/327,299, filed on Apr. 25, 2016.

(51) Int. Cl.
| | | |
|---|---|---|
| *H04W 56/00* | (2009.01) | |
| *H04B 13/00* | (2006.01) | |
| *H04W 4/70* | (2018.01) | |

(52) U.S. Cl.
CPC ...... *H04W 56/0005* (2013.01); *H04B 13/005* (2013.01); *H04W 4/70* (2018.02)

(58) Field of Classification Search
CPC ... H04W 56/0005; H04W 4/70; H04W 12/06; G07C 9/00039; G07C 9/00087; H04L 63/0492; H04L 63/0869
See application file for complete search history.

(56) References Cited

U.S. PATENT DOCUMENTS

| 8,706,163 | B2* | 4/2014 | Hoeksel | G04R 20/04 |
| | | | | 342/357.21 |
| 2012/0242501 | A1* | 9/2012 | Tran | A61B 5/0024 |
| | | | | 340/870.02 |
| 2014/0341143 | A1* | 11/2014 | Yang | H04L 5/001 |
| | | | | 370/329 |

OTHER PUBLICATIONS

Elson, J. et al., "Fine-grained network time synchronization using reference broadcasts," Proceeding of the Fifth Symposium on Operating Systems Design and Implementation (OSDI '02), vol. 36, pp. 147-163, Dec. 2002.

Zhang, Z., et al, "Compressed Sensing of EEG for Wireless Telemonitoring With Low Energy Consumption and Inexpensive Hardware," IEEE Transactions on Biomedical Engineering, vol. 60, No. 1, pp. 221-224, Jan. 2013.

(Continued)

*Primary Examiner* — Anez C Ebrahim
(74) *Attorney, Agent, or Firm* — NIWC Pacific; Kyle Eppele; Ryan J. Friedl

(57) ABSTRACT

A WBAN system for real-time telemonitoring health of a subject, involving a wearable biosignal sensors, each sensor of the sensors configured to measure a plurality of biosignals, ultra-low-power radios correspondingly coupled with the sensors; and a processor operable with at least one of the sensors and the radios, each radio of the radios configured to receive the biosignals from each corresponding sensor and to transmit the biosignals to a processor via a WBAN, and the processor configured to: receive the biosignals from the radios, process the biosignals via a set of executable instructions storable in relation to a nontransitory memory device, the set of executable instructions comprising an instruction for synchronizing time of the biosignals by using the broadcasted R peak reference, whereby real-time health data is providable, and transmit the real-time health data to a healthcare provider.

6 Claims, 4 Drawing Sheets

(56) References Cited

OTHER PUBLICATIONS

Jeon, D. et al., "24.3 An implantable 64nW ECG-monitoring mixed-signal SoC, for arrhythmia diagnosis," IEEE International Solid-State Circuits Conference (ISSCC), Digest of Technical Papers, pp. 416-417, Feb. 2014.

Torfs, T. et al., "Ultra low power wireless ECG system with beat detection and real time impedance measurement," IEEE Biomedical Circuits and Systems Conference (BioCAS), pp. 33-36, Nov. 2010

Chen, F. et al., "Design and Analysis of a Hardware-Efficient Compressed Sensing Architecture for Data Compression in Wireless Sensors," IEEE Journal of Solid-State Circuits, vol. 47, No. 3, pp. 744-756, Mar. 2012.

Palchaudhuri, S. et al. "Adaptive clock synchronization in sensor networks," Information Processing in Sensor Networks (IPSN), pp. 340-348, Apr. 2004.

Kim, H. et al, "A Configurable and Low-Power Mixed Signal SoC for Portable ECG Monitoring Applications," IEEE Transactions on Biomedical Circuits and Systems, vol. 8, No. 2, pp. 257-267, Apr. 2014

Zou, Y. et al, "An Energy-Efficient Design for ECG Recording and R-Peak Detection Based on Wavelet Transform," IEEE Transactions on Biomedical Circuits and Systems II: Express Briefs, vol. 62. No. 2, pp. 119-123, Feb. 2015

He, X. et al., "Secondary Peak Detection of PPG Signal for Continuous Cuffless Arterial Blood Pressure Measurement," IEEE Transactions on Instrumentation and Measurement, vol. 63, No. 6, pp. 1431-1439, Jun. 2014.

"Timing and Synthronization for LTE-TDD and LTE-Advanced Mobile Networks," Symmetricom, San Jose, CA, 2013.

Galleani, L., "A tutorial on the two-state model of the atomic clock noise," Metrologia, vol. 45, No. 6, pp. 175-182, Dec. 2008.

Kahn, J. et al., "Next century challenges: mobile networking for Smart Dust." Proceeding MobiCom '99, Proceedings of the 5th annual ACM/IEEE international conference on Mobile computing and networking, pp. 271-278, Aug. 1999.

Goldberger, A. et al., "Physiobank, physiotoolkit, and physionet: Components of a new research resource for complex physiologic signals," Circulation, vol. 101, No. 23, pp. e-215-e-220, Jun. 2000.

Klepczynski, W. et al., "Frequency stability requirements for narrow band receivers," Precise Time and Time Interval Meeting (PTTI), Nov. 2000.

Akhlaq, M. et al., "RTSP: An Accurate and Energy-Efficient Protocol for Clock Synchronization in WSNs," IEEE Transactions on Instrumentation and Measurement, vol. 62, No. 3, pp. 578-589, Mar. 2013.

* cited by examiner

WIRELESS BODY-AREA NETWORK TIME SYNCHRONIZATION USING R PEAK REFERENCE BROADCASTS

CROSS-REFERENCE TO RELATED APPLICATION

This document is a nonprovisional patent application, claiming the benefit of, and priority to, U.S. Patent Application Ser. No. 62/327,299, entitled "WIRELESS BODY-AREA NETWORK TIME SYNCHRONIZATION USING R PEAK REFERENCE BROADCASTS," filed on Apr. 25, 2016, which is hereby incorporated by reference in its entirety.

FEDERALLY-SPONSORED RESEARCH AND DEVELOPMENT

The United States Government has ownership rights in the subject matter of the present disclosure. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 103,670.

BACKGROUND OF THE INVENTION

Technical Field

The present disclosure technically relates to wireless networks. Particularly, the present disclosure technically relates to wireless network synchronization.

Description of Related Art

Telemonitoring of biosignals is a growing area of research due to the aging world population. Telemonitoring utilizes a wireless body-area network (WBAN) involving wearable biosignal sensors equipped with ultra-low-power radios. The measured data from each sensor on the patient is sent to a smartphone, which then sends the data to a healthcare provider via the Internet. Thus, the patient's health is monitored continuously and remotely in real-time without the need for the patient to visit the doctor. Some of the disadvantages of related art systems is that the synchronization algorithm (a) is not present, (b) has not taken into account power consumption of the low power device, or (c) timestamps the data at a server which is subject to nondeterministic network latencies thus providing inaccurately time-stamped data.

Related art systems have not provided real-time telemonitoring of the biosignals with accurate timestamped data from the sensors in a WBAN using synchronization algorithms that consume little power. For example, if a sensor uses a low-cost 32,769-Hz crystal oscillator with a frequency stability of 100 ppm, the time offset can be as high as 259 seconds after one month of use without any synchronization algorithm. Accurate timestamped data is especially important for data consistency to sensors that store their measured data and infrequently send their measured data to a smartphone.

One of the major constraints in WBAN is power consumption, since these sensors are generally meant to be used for weeks, months, and even years. The power consumed by wirelessly transmitting the data to a smartphone is orders of magnitude higher than the power consumed by any operation, e.g., analog-to-digital conversion and digital signal processing, and, thus, must be minimized. Therefore, a need exists for a synchronization of signals in WBANs that also reduces power consumption.

SUMMARY OF INVENTION

To address at least the needs in the related art, the present disclosure generally involves a WBAN system for real-time telemonitoring health of a subject, comprising: a plurality of wearable biosignal sensors, each sensor of the plurality of sensors configured to measure a plurality of biosignals; a plurality of ultra-low-power radios correspondingly coupled with the plurality of sensors; and a processor operable with at least one of the plurality of sensors and the plurality of radios, each radio of the plurality of radios configured to receive the plurality of biosignals from each corresponding sensor and to transmit the plurality of biosignals to a processor via a WBAN, and the processor configured to: receive the plurality of biosignals from the plurality of radios, process the plurality of biosignals via a set of executable instructions storable in relation to a nontransitory memory device, the set of executable instructions comprising an instruction for synchronizing time of the plurality of biosignals by using the broadcasted R peak reference, whereby real-time health data is providable, and transmit the real-time health data to a healthcare provider.

BRIEF DESCRIPTION OF THE DRAWING

The above, and other aspects, features, and benefits of several embodiments of the present disclosure are further understood from the following Detailed Description of the Invention as presented in conjunction with the following several figures of the Drawing.

Figure 1:
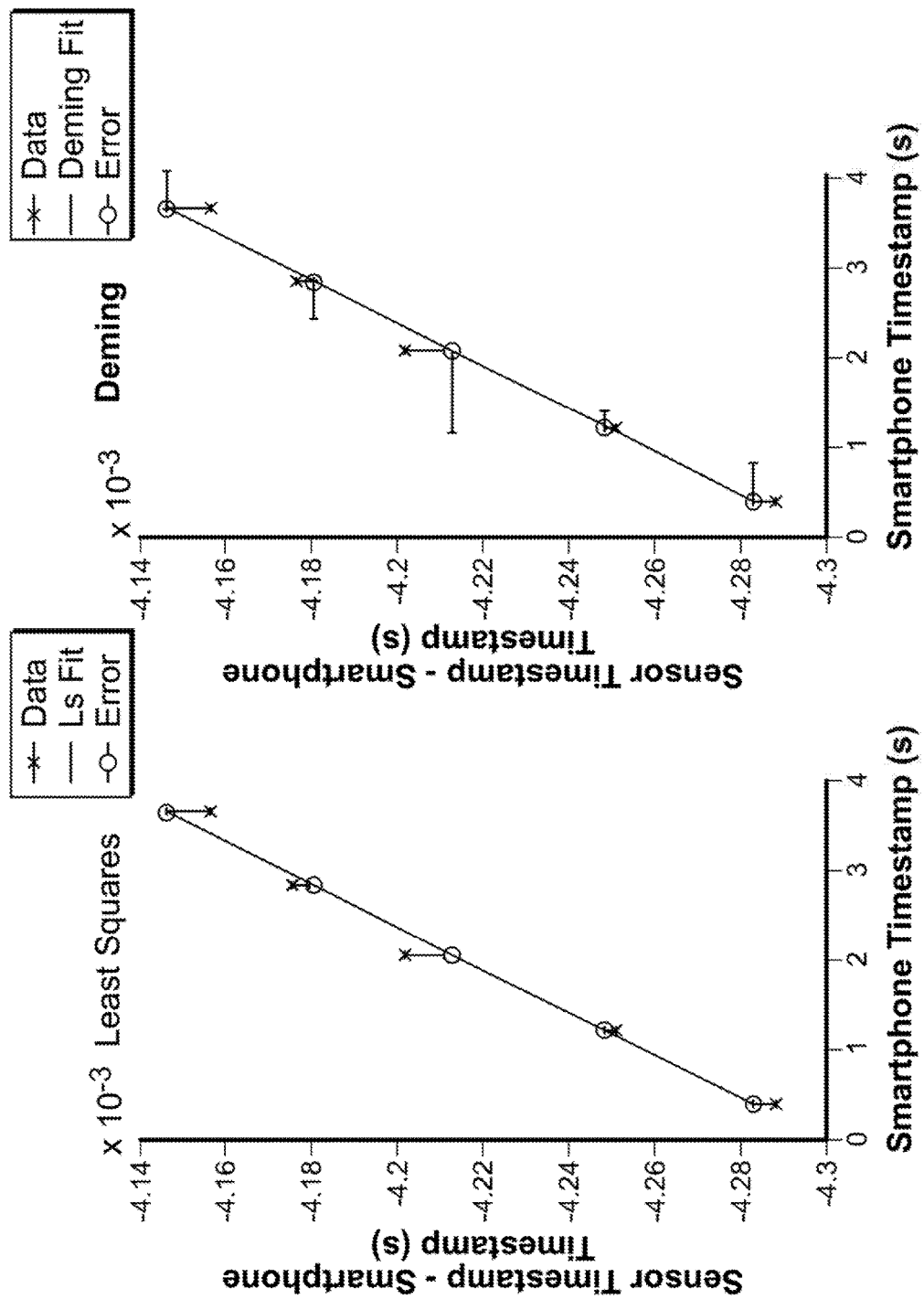
FIG. 1A is a graphical diagram illustrating a least-squares (LS) regression as a function of a smartphone timestamp, as usable in a set of executable instructions by a processor of a telemonitoring system, in accordance with an embodiment of the present disclosure.
FIG. 1B is a graphical diagram illustrating a Deming regression as a function of a smartphone timestamp, as usable in a set of executable instructions by a processor of a telemonitoring system, in accordance with an embodiment of the present disclosure.

Corresponding reference numerals or characters indicate corresponding components throughout the several figures of the Drawing. Elements in the several figures are illustrated for simplicity and clarity and have not necessarily been drawn to scale. For example, the dimensions of some of the elements in the figures may be emphasized relative to other elements for facilitating understanding of the various presently disclosed embodiments. Also, common, but well-understood, elements that are useful or necessary in commercially feasible embodiments are often not depicted in order to facilitate a less obstructed view of these various embodiments of the present disclosure.

DETAILED DESCRIPTION OF THE EMBODIMENT(S)

Network Synchronization

In accordance with embodiments of the present disclosure, various solutions for network synchronization are provided. For network synchronization, a challenge exists in the nondeterministic latencies in the exchange of timing messages from one node (a sending node) to another node (a receiving node) in a network. Examples of sources of these nondeterministic latencies include, but are not limited to, (a) a transmitting time delay, such as a time period required for generating a message and transmitting the message to a network interface, (b) an accessing time delay, such as a time period required in waiting for the network interface to gain access to a transmission channel, (c) a propagation time delay, such as a time period required for physically transmitting the message from the sending node to the receiving node, and (d) a receiving time delay, such as a time period required by a receiving network interface for receiving and processing the message.

The propagation time delay, relative to some other forms of time delay, is short for a telemonitoring system, such as a WBAN system S (FIGS. 4-6), of the present disclosure, e.g., in a range on an order of approximately nanoseconds, as the system S comprises a plurality of wearable sensors 10 that are disposable in a distributed manner in relation to the subject 5, e.g., disposable in relation to various parts of a patient's body. For at least this reason, the transmitting time delay, the accessing time delay, and the receiving time delay are the main sources of nondeterministic latencies, wherein the transmitting time delay and the accessing time delay are each greater than the receiving time delay.

Reference Broadcast Synchronization (RBS)

In the system S, a processor 30 is operable by way of a set of executable instructions comprising an instruction for performing an RBS (FIGS. 4-6), whereby nondeterministic latencies arising from transmitting time delay and the accessing time delay are eliminated. Performing RBS, by the system S via the processor 30, comprises using a broadcast message, corresponding to an R peak reference, to synchronize each receiver of a set of receivers with one another, whereby each node in the set of receivers is configured to receive the same broadcast message, and whereby each node in the set of receivers respectively experiences only nondeterministic latencies from only propagation time delay and receiving time delay.

In general, RBS is performed as follows: assuming that a set of receivers comprises two nodes, e.g., a node i and a node j, wherein $t_{i,A}$ denotes a time that event A occurs with respect to a clock corresponding to the node i; broadcasting N distinct messages B to the node i and the node j via a transmitting node, wherein the node i and the node j respectively record a receipt time for the N distinct messages B, and whereby respective timestamps $t_{i,B}=\{t_{i,B1}, \ldots, t_{i,BN}\}^T$ and $t_{j,B}=[t_{j,B1}, \ldots, t_{j,BN}]^T$ are generated; exchanging respective timestamps $t_{i,B}=\{t_{i,B1}, \ldots, t_{i,BN}\}^T$ and $t_{j,B}=[t_{j,B1}, \ldots, t_{j,BN}]^T$ between the node i and the node j; performing a least-squares regression in relation to the node i, thereby determining a best linear fit for the expression y=mx+b, wherein $y=t_j-t_i$, $x=t_i$, m=a clock skew, e.g., a rate of change in the time difference between the two clocks, as measured in relation to the node i, and b=the time difference between the two clocks at the time $t_{i,B1}$, thereby enabling conversion of any timestamp from the node j's clock to a timestamp which would have been generated by the node i's clock, and, also, thereby enabling conversion of any timestamp from the node i's clock to a timestamp which would have been generated by the node j's clock, whereby the two nodes of the set of receivers are synchronized with one another. In this manner, RBS provides synchronization that is more precise than that provided by the related art systems that measure round-trip delay and also provides post-facto synchronization, e.g., wherein previous time offsets are now estimable at a later time by way of the WBAN system S via the processor 30.

In the system S, the WBAN 60 comprises a single-hop network, e.g., wherein each device in the WBAN 60 can directly communicate with any other device in the WBAN 60, and wherein the device comprises another device, such as a wearable sensor 10, e.g., an ECG sensor, a smartphone 40, a smartwatch, an inertial measurement unit, a temperature sensor, a galvanic skin response sensor, any biometric sensor, and the like. If the wearable sensor 10 comprises an ECG sensor, and for at least that ECG data is generally analyzed for an RR interval, wherein the RR interval comprises a period of time between heart beats, and wherein P, Q, and R refer to characteristic peaks or points on an ECG signal waveform, and whereby heart-rate variability is determinable, the system S is configured to use two system architectures: a first architecture, Architecture A, wherein the ECG sensor is configured to transmit a short flag message every time that an R peak is detected, wherein the short flag message serves as a broadcast message to all devices, excluding the ECG sensor, in the WBAN 60, and wherein each receiving device records the time at which such device receives the short flag message; and a second architecture, Architecture B, wherein the ECG sensor is configured to transmit an entire ECG data stream, such as a compressed ECG data stream or an uncompressed ECG data stream, wherein the entire ECG data stream serves as a broadcast message to all devices, excluding the ECG sensor, in the WBAN 60, and wherein each receiving device, such as a device i is configured to perform an R peak detection on the entire ECG data stream and to determine a time at which each R peak occurs, wherein each R peak serves as a notable timestamp point for at least its distinct shape and facile identification, and wherein a set of times at which each R peak occurs defines $t_i$.

In both foregoing architectures used by the system S, the broadcast message is transmittable to, and receivable by, a smartphone 40 as well as by any other device in the WBAN 60. The broadcast message is compliant with short-range, low-power, wireless communications standards, e.g., IEEE 802.15.6 and Bluetooth®, whereby each device in the WBAN 60, excluding the ECG sensor, is configured to receive and process the broadcast message without using any additional hardware. Relative to Architecture B, Architecture A does not require R peak detection at the receiving devices, consumes less power for at least that the ECG in Architecture A transmits significantly less data than otherwise transmitting via Architecture B, and has a lower receiving time delay. For many implementations, Architecture A is preferred for the system S.

In the system S, implementing Architecture A, whenever any wearable sensor 10 of the plurality of wearable sensors 10 needs to transfer data to the smartphone 40, the sensor 10 also transmits N timestamps, corresponding to the reception times of the broadcast messages, whereby the smartphone 40 can convert the N timestamps from the sensor 10's clock to timestamps that would have been generated by the smartphone's clock (not shown), e.g., via the processor 30. However, if the sensor 10 stores its data and infrequently transmits such data to the smartphone 40, the N timestamps correspond to the time window within which data of interest has been measured, wherein the smartphone 40 is assumed to be synchronized to approximately 1.5 μs of Coordinated Universal Time (UTC), whereby the smartphone's clock does not deviate much from the "true" time, as otherwise would the sensor 10's clock. The system S, implementing Architecture A, instead of using LS regression, in combination with RBS, for determining the best linear fit to the expression y=mx+b, the system S alternatively uses Deming regression, e.g., in combination with RBS, to account for errors in the timestamps, e.g., from clock offset relative to UTC and to the receiving time delay of both the sensor 10 and the smartphone 40.

Referring to FIG. 1A, this graphical diagram illustrates an LS regression as a function of a smartphone timestamp, as usable in a set of executable instructions executable by a processor 30 of a telemonitoring system, e.g., a WBAN system S, in accordance with an embodiment of the present disclosure. FIG. 1A illustrates an LS regression as a function of a smartphone timestamp, whereby only errors in the y-axis data are accounted.

Referring to FIG. 1B, this graphical diagram illustrates a Deming regression as a function of a smartphone timestamp, as usable in a set of executable instructions executable by a processor 30 of a telemonitoring system, e.g., a WBAN system S, in accordance with an embodiment of the present disclosure. FIG. 1B illustrates a Deming regression as a function of a smartphone timestamp, whereby errors in both the x-axis data and the y-axis data are accounted. Noted is that errors in the x-axis data in FIG. 1B are increased by a factor of $10^{11}$ for facilitating visibility only.

Simulation Results

Example simulation results are provided to evaluate synchronization performance of a WBAN system S, using RBS. Initially, a clock model for generating time and frequency data is discussed. Subsequently, a receiving time delay model is discussed.

Clock Model

A clock offset is a difference in time between a clock n's time and the "true" time at a discrete time k. A two-state clock model effectively models clock dynamics and is expressed by equation 1 as follows:

$$\begin{bmatrix} \theta_n(k) \\ \xi_n(k) \end{bmatrix} = \begin{bmatrix} 1 & T \\ 0 & 1 \end{bmatrix} \begin{bmatrix} \theta_n(k-1) \\ \xi_n(k-1) \end{bmatrix} + \vec{w}_n(k), \qquad (1)$$

wherein T=the time interval between state updates, wherein $\xi_n$ represents a Wiener process contributing to the rate of change in $\theta_n$, and wherein $\vec{w}_n(k)$ represents a zero-mean process noise with a covariance expressed by $$Q_n = \begin{bmatrix} q_{1,n}T + q_{2,n}T^3/3 & q_{2,n}T^2/2 \\ q_{2,n}T^2/2 & q_{2,n}T \end{bmatrix}, \qquad (2)$$

wherein parameters $q_{1,n}$ and $q_{2,n}$ are obtainable from the Allan variance of sensor node n's oscillator from the expression $$\sigma_n^2(\tau) = \frac{q_{1,n}}{\tau} + \frac{q_{2,n}\tau}{3}. \qquad (3)$$

Receiving Time Delay

In sample testing, RBS has been implemented in relation to a network of Berkeley Mote platforms (a small, low-power, low-cost radio-and-sensor platform), wherein the receiving time delay has been experimentally shown Gaussian and having a zero-mean and a standard deviation of approximately 11.1 μs. Also, the resolution of the receive timestamp of the reference broadcast messages has been found to be approximately 2 μs. Hence, performance of the WBAN system S, using RBS, has been simulated using the receiver characteristics of the Berkeley Mote platform.

Synchronization Performance

The foregoing example of a simulated WBAN system S comprises a sensor 10, e.g., an ECG sensor, a smartphone 40, a Berkeley Mote platform (not shown), and used data, comprising "Record 16773" of the MIT-BIF Normal Sinus rhythm Database, wherein Record 16773 comprises a 24-hour recording of ECG data from a 26-year old subject having no significant arrhythmia. Locations of R peaks have been determined by the system S via the processor 30 using a MATLAB® "findpeaks" function. A total of 81,983 peaks occurred in such 24-hour period.

Both the smartphone 40 and the Berkeley Mote platform use the receiver characteristics from the foregoing receiver characteristics in this experiment. In this example, the smartphone 40 is synchronized to within 1.5 μs of UTC, e.g., having a time offset that is Gaussian with zero-mean and a standard deviation of 1.5 μs. The Berkeley Mote platform uses a 32,768-Hz crystal oscillator with a frequency stability of 100 ppm; and the parameters $q_{1,n}$ and $q_{2,n}$ are determined by using the Allan variance given for a poor crystal oscillator. Without any synchronization, the clock offset of the Berkley Mote platform is over approximately 8 s by the end of the 24-hour period.

Figure 2:
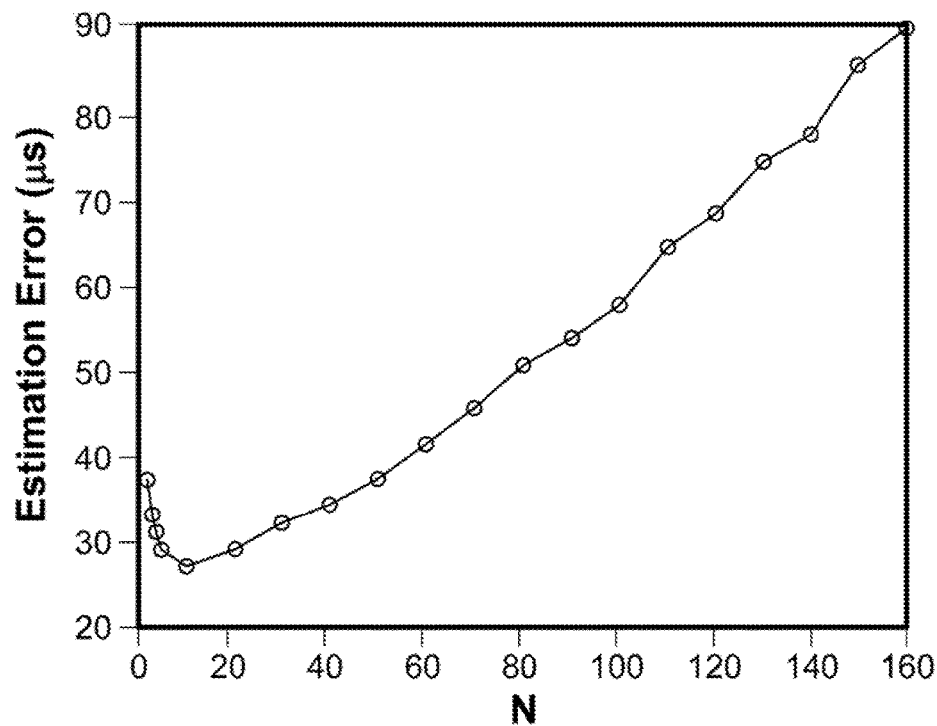
FIG. 2 is a graphical diagram illustrating a synchronization performance as a function of N timestamps, obtainable via a reference-broadcast synchronization (RBS), as included in an executable instruction usable by a processor of a telemonitoring system, in accordance with an embodiment of the present disclosure.

Referring to FIG. 2, this graphical diagram illustrates a synchronization performance as a function of N timestamps, obtainable via an RBS, as included in an instruction executable by a processor 30 of a telemonitoring system, e.g., a WBAN system S, in accordance with an embodiment of the present disclosure. An estimation error of the Deming regression line is shown using a window of N timestamps (See also FIG. 1B). The estimation error is given by the 2-norm of the difference between the true data point (formed using the true timestamps without any error) and the estimated data point (using Deming regression with the measured timestamps). The estimation error is calculated for each of the 81,983 data points; and each circle symbol represents the value that 95.45% of the estimation errors are less than that for a given N. For example, 95.45% of the 81,983 estimation errors are less than approximately 27 μs using a window size of N=10 timestamps. The best synchronization accuracy is achieved for approximately $2 \leq N \leq 50$, e.g., a sufficiently short window of time in which the linear relationship holds between the clocks of the sensor 10 and the smartphone 40. For N>50, the linear approximation degrades along with the synchronization performance.

Figure 3:
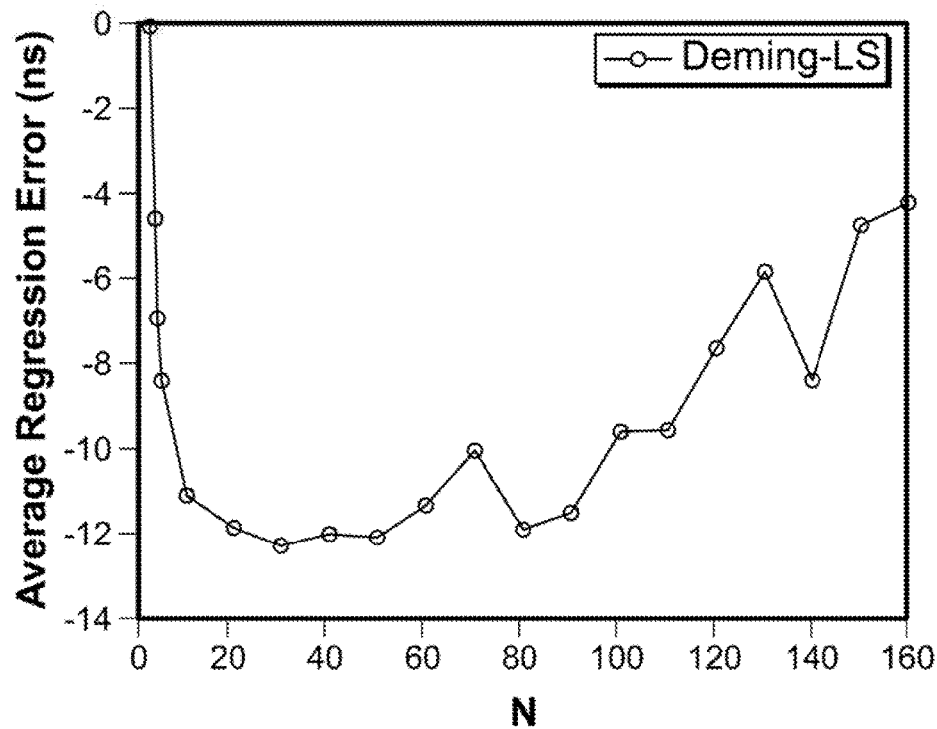
FIG. 3 is a graphical diagram illustrating an enhanced synchronization performance as a function of N timestamps, obtainable via removing a synchronization component of a LS regression from an RBS, as included in an executable instruction usable by a processor of a telemonitoring system, in accordance with an embodiment of the present disclosure.

Referring to FIG. 3, this graphical diagram illustrates an enhanced synchronization performance as a function of N timestamps, obtainable via removing a synchronization component of a LS regression from an RBS, as included in an instruction executable by a processor 30 of a telemonitoring system, e.g., a WBAN system S, in accordance with an embodiment of the present disclosure. In FIG. 3, the estimation error for each of the 81,983 data points that is obtained using LS regression is subtracted from the estimation error that is obtained using Deming regression; and then the mean is taken. The Deming regression performs slightly better than the LS regression for at least that the curve is negative. Noted is that the range of $10 \leq N \leq 50$ (wherein the best synchronization accuracy is achieved as shown in FIG. 2), Deming regression performs over approximately 10 nanoseconds better on average than does LS regression. While this improvement appears negligible as the error budget is on the order of tens of microseconds, this improvement becomes significant when precise hardware timestamps are available.

Figure 4:
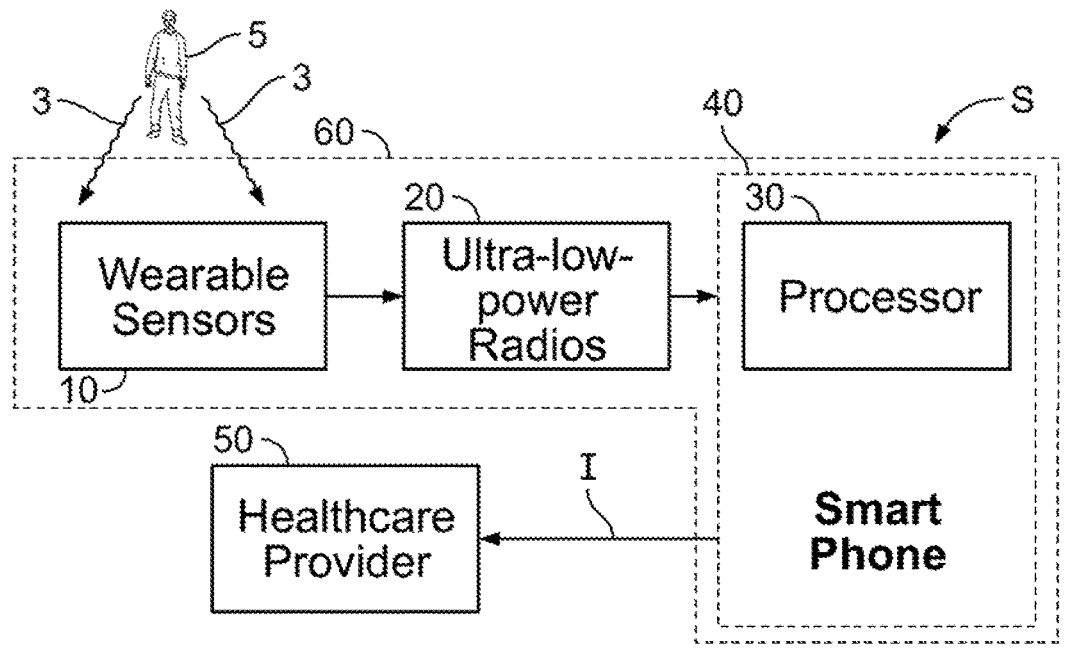
FIG. 4 is a schematic diagram illustrating a WBAN system for real-time telemonitoring health of a subject, using RBS, in accordance with an embodiment of the present disclosure.

Referring to FIG. 4, this schematic diagram illustrates a WBAN system S for real-time telemonitoring health of a subject 5, in accordance with an embodiment of the present disclosure. The WBAN system S comprises: a plurality of wearable biosignal sensors 10, each wearable biosignal sensor 10 of the plurality of wearable biosignal sensors 10 configured to measure a plurality of biosignals 3; a plurality of ultra-low-power radios 20 correspondingly coupled with the plurality of wearable biosignal sensors 10, each radio 20 of the plurality of ultra-low-power radios 20 configured to receive the plurality of biosignals 3 from each corresponding sensor 10 and to transmit the plurality of biosignals 3 to a smartphone 40 via a WBAN 60; and a processor 30 operable with at least one of the plurality of wearable biosignal sensors 10 and the plurality of ultra-low-power radios 20, the processor 30 configured to receive the plurality of biosignals from the plurality of ultra-low-power radios 20, process the plurality of biosignals 3 via a set of executable instructions storable in relation to a nontransitory memory device (not shown), the set of executable instructions comprising an instruction for synchronizing time of the plurality of biosignals 3 using the broadcasted R peak reference, whereby real-time health data is providable, and transmit the real-time health data to the healthcare provider 50.

Still referring to FIG. 4 and back to FIG. 3, the WBAN system S leverages ECG data that is transmitted from a sensor 10, e.g., an ECG sensor, whereby no additional power is consumed for transmitting the reference broadcast. Further, in contrast to related art systems which expend additional energy in continuously synchronizing clocks, the system S uses post-facto synchronization, thereby allowing the smartphone 40 to convert timestamps of the sensor's clock to the timestamps that would have been generated by the smartphone's clock at a later time, thereby providing an important feature for data consistency to sensors 10 that store their data and infrequently transmit their data to the smartphone 40, e.g., via nightly readouts. The system S uses the R peak as a signal of opportunity for synchronization, e.g., any signal that is used for positioning, navigation, or timing (PNT), whether or not such signal is originally earmarked for PNT. The R peaks serve as a reference broadcast for the WBAN 60 in an RBS scheme.

Still referring to FIG. 4, the processor 30 is configured to at least one of: receive the plurality of biosignals 3 from the plurality of radios 20 via the smartphone 40, process the plurality of biosignals 3 via the smartphone 40, and transmit the health data via the smartphone 40 to a healthcare provider 50 via the Internet I. The WBAN 60 comprises a single-hop network, wherein any device in the WBAN 60 is capable of directly communicating with any other device in the WBAN 60. The set of executable instructions comprises an instruction for performing an RBS, and whereby a nondeterministic latency arising from at least one of a transmitting time delay and an accessing time delay is eliminated.

Still referring to FIG. 4, the instruction for performing an RBS comprises an instruction for performing RBS by using a broadcast message corresponding to an R peak reference to synchronize each receiver of a set of receivers with one another, whereby each node in the set of receivers is configured to receive the same broadcast message, and whereby each node in the set of receivers respectively experiences a nondeterministic latency arising from only at least one of a propagation time delay and a receiving time delay. The device comprises a sensor 10, e.g., an ECG sensor, wherein the plurality of biosignals 3 comprises a plurality of sensors 10, e.g., a plurality of ECG signals, the plurality of ECG signals providing ECG data.

Still referring to FIG. 4, the processor 30 is configured to operate via one of: (a) a first system architecture, wherein the sensor 10, e.g., the ECG sensor, is configured to transmit a short flag message every time that an R peak is detected, wherein the short flag message serves as a broadcast message to all devices, excluding the sensor 10, e.g., the ECG sensor, in the WBAN 60, and wherein each receiving device records the time at which such device receives the short flag message; and (b) a second architecture, wherein the sensor 10, e.g., the ECG sensor, is configured to transmit an entire ECG data stream, wherein the entire ECG data stream serves as a broadcast message to all devices, excluding the sensor 10, e.g., the ECG sensor, in the WBAN 60, and wherein each receiving device is configured to perform an R peak detection on the entire data steam, e.g., the entire ECG data stream, and to determine a time at which each R peak occurs, wherein each R peak serves as a notable timestamp point for at least its distinct shape and facile identification, and wherein a set of times at which each R peak occurs defines $t_i$.

Still referring to FIG. 4, the broadcast message is transmittable to, and receivable by, one of a smartphone 40 and any other device in the WBAN 60, wherein the broadcast message complies with at least one short-range, low-power, wireless, communication standard, wherein the at least one short-range, low-power, wireless, communication standard comprises at least one of IEEE 802.15.6 and Bluetooth®, whereby each device in the WBAN 60, excluding the sensor 10, e.g., the ECG sensor, is configured to receive and process the broadcast message in an absence of additional hardware.

Figure 5:
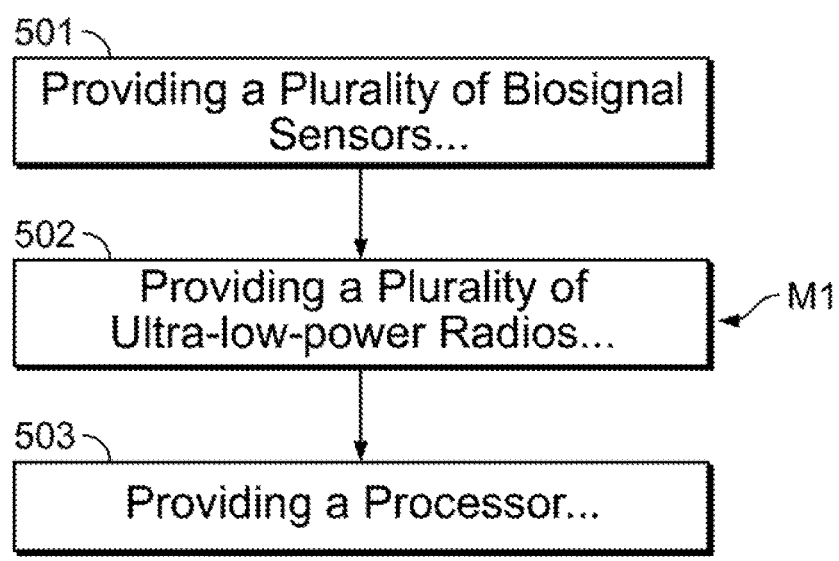
FIG. 5 is a flow diagram illustrating a method of fabricating a WBAN system for real-time telemonitoring health of a subject, using RBS, in accordance with an embodiment of the present disclosure.

Referring to FIG. 5, this is a flow diagram illustrates a method M1 of fabricating a WBAN system S for real-time telemonitoring health of a subject 5, in accordance with an embodiment of the present disclosure. The method M1 comprises: providing a plurality of wearable biosignal sensors 10, each sensor 10 of the plurality of sensors 10 configured to measure a plurality of biosignals 3, as indicated by block 501; providing a plurality of ultra-low-power radios 20 correspondingly coupled with the plurality of sensors 10, as indicated by block 502; and providing a processor 30 operable with at least one of the plurality of sensors 10 and the plurality of radios 20, as indicated by block 503, providing the plurality of ultra-low-power radios 20, as indicated by block 502, comprising configuring each radio 20 of the plurality of ultra-low-power radios 20 to receive the plurality of biosignals 3 from each corresponding sensor 10 and to transmit the plurality of biosignals 3 to the processor 30 via a WBAN 60 and providing the processor 30, as indicated by block 503, comprising configuring the processor 30 to: receive the plurality of biosignals 3 from the plurality of radios 20, process the plurality of biosignals 3 via a set of executable instructions storable in relation to a nontransitory memory device (not shown), the set of instructions comprising an instruction for synchronizing time of the plurality of biosignals 3 by using the broadcasted R peak reference, whereby real-time health data is providable, and transmit the real-time health data to a healthcare provider. A mobile application program may comprise the set of executable instructions, in an embodiment of the present disclosure. The system S further comprises a smartphone, in an embodiment of the present disclosure.

Still referring to FIG. 5, in the method M1, providing the processor 30 optionally comprises at least one of: configuring the processor 30 to receive the plurality of biosignals 3 from the plurality of radios 20 via the smartphone 40, configuring the processor 30 to process the plurality of biosignals 3 via the smartphone 40, and configuring the processor 30 to transmit the health data via the smartphone 40 to a healthcare provider 50 via the Internet I. Providing the plurality of ultra-low-power radios 20 comprises providing the WBAN 60 as a single-hop network, wherein any device in the WBAN 60 is capable of directly communicating with any other device in the WBAN 60.

Still referring to FIG. 5, in the method M1, providing the processor 30 comprises providing the set of instructions with an instruction for performing an RBS, and whereby a nondeterministic latency arising from at least one of a transmitting time delay and an accessing time delay is eliminated; and providing the set of instructions with the instruction for performing an RBS comprises providing an instruction for performing RBS by using a broadcast message corresponding to an R peak reference to synchronize each receiver of a set of receivers with one another, whereby each node in the set of receivers is configured to receive the same broadcast message, and whereby each node in the set of receivers respectively experiences a nondeterministic latency arising from only at least one of a propagation time delay and a receiving time delay.

Still referring to FIG. 5, in the method M1, providing the WBAN 60 as the single-hop network comprises providing the device as the sensor 10, e.g., an ECG sensor, wherein the plurality of biosignals 3 comprises a plurality of ECG signals, the plurality of ECG signals providing ECG data; and providing the processor 30 comprises configuring the processor 30 to operate via one of: (a) a first architecture, wherein the sensor 10, e.g., the ECG sensor, is configured to transmit a short flag message every time that an R peak is detected, wherein the short flag message serves as a broadcast message to all devices, excluding the ECG sensor, in the WBAN 60, and wherein each receiving device records the time at which such device receives the short flag message, and (b) a second architecture, wherein the sensor 10, e.g., the ECG sensor, is configured to transmit an entire ECG data stream, wherein the entire ECG data stream serves as a broadcast message to all devices, excluding the sensor 10, e.g., the ECG sensor, in the WBAN 60, and wherein each receiving device is configured to perform an R peak detection on the entire ECG data stream and to determine a time at which each R peak occurs, wherein each R peak serves as a notable timestamp point for at least its distinct shape and facile identification, and wherein a set of times at which each R peak occurs defines $t_i$.

Still referring to FIG. 5, in the method M1, the broadcast message is transmittable to, and receivable by, one of a smartphone and any other device in the WBAN 60, wherein the broadcast message complies with at least one short-range, low-power, wireless, communication standard, wherein the at least one short-range, low-power, wireless, communication standard comprises at least one of IEEE 802.15.6 and Bluetooth®, whereby each device in the WBAN 60, excluding the sensor 10, e.g., the ECG sensor, is configured to receive and process the broadcast message in an absence of additional hardware.

Figure 6:
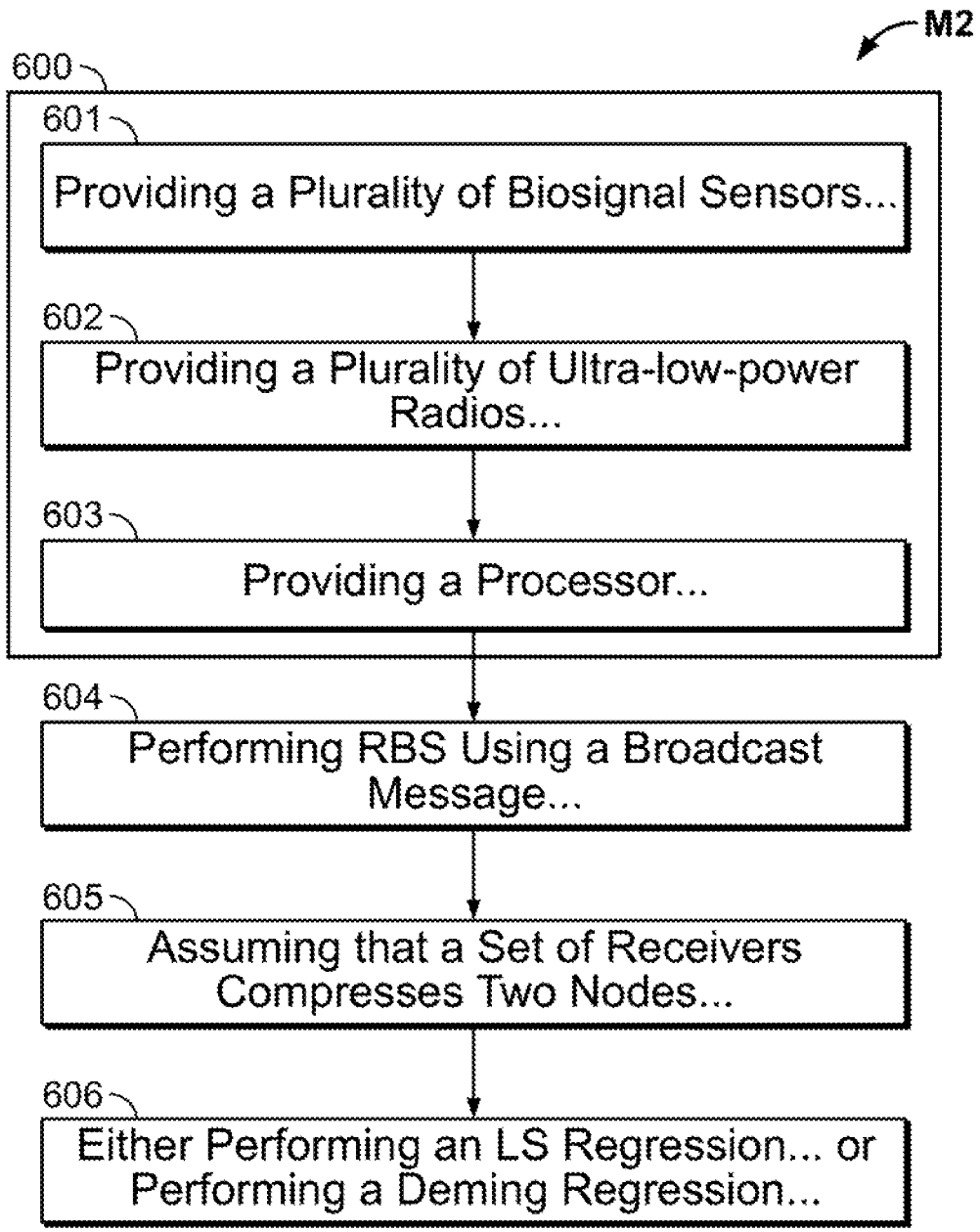
FIG. 6 is a flow diagram illustrating a method of real-time telemonitoring health of a subject by way of a WBAN system, using RBS, in accordance with an embodiment of the present disclosure.

Referring to FIG. 6, this flow diagram illustrates a method M2 of real-time telemonitoring health of a subject 5 by way of a WBAN system S, in accordance with an embodiment of the present disclosure. The method M2 comprises providing the WBAN system S, as indicated by block 600, providing the system S comprising: providing a plurality of wearable biosignal sensors 10, each sensor 10 of the plurality of sensors 10 configured to measure a plurality of biosignals 3, as indicated by block 601; providing a plurality of ultra-low-power radios 20 correspondingly coupled with the plurality of sensors 10, as indicated by block 602; and providing a processor 30 operable with at least one of the plurality of sensors 10 and the plurality of radios 20, as indicated by block 603, providing the plurality of ultra-low-power radios 20, as indicated by block 602, comprising configuring each radio 20 of the plurality of ultra-low-power radios 20 to receive the plurality of biosignals 3 from each corresponding sensor 10 and to transmit the plurality of biosignals 3 to the processor 30 via a WBAN 60 and providing the processor 30, as indicated by block 603, comprising configuring the processor 30 to: receive the plurality of biosignals 3 from the plurality of radios 20, process the plurality of biosignals 3 via a set of executable instructions storable in relation to a nontransitory memory device (not shown), the set of instructions comprising an instruction for synchronizing time of the plurality of biosignals 3 by using the broadcasted R peak reference, whereby real-time health data is providable, and transmit the real-time health data to a healthcare provider 50; performing RBS using a broadcast message, corresponding to an R peak reference, to synchronize each receiver of a set of receivers with one another, whereby each node in the set of receivers is configured to receive the same broadcast message, and whereby each node in the set of receivers respectively experiences only nondeterministic latencies from only propagation time delay and receiving time delay, as indicated by block 604.

Still referring to FIG. 6, in an alternative embodiment of the method M2, performing RBS comprises: assuming that a set of receivers comprises two nodes, the two nodes comprising a first node and a second node, wherein $t_{first\ node,A}$ denotes a time that event A occurs with respect to a clock corresponding to the first node; broadcasting N distinct messages B to the first node and the second node via a transmitting node, wherein the first node and the second node respectively record a receipt time for the N distinct messages B, and whereby respective timestamps $t_{first\ node,B} = \{t_{first\ node,B1}, \ldots, t_{first\ node,BN}\}^T$ and $t_{second\ node,B} = \{t_{second\ node,B1}, \ldots, t_{second\ node,BN}\}^T$ are generated; exchanging respective timestamps $t_{first\ node,B} = \{t_{first\ node,B1}, \ldots, t_{first\ node,BN}\}^T$ and $t_{second\ node,B} = \{t_{second\ node,B1}, \ldots, t_{second\ node,BN}\}^T$ between the first node and the second node, as indicated by block 605; and performing a least-squares regression in relation to the node i, thereby determining a best linear fit for the expression y=mx+b, wherein $y=t_j-t_i$, $x=t_i$, m=a clock skew, e.g., a rate of change in the time difference between the two clocks, as measured in relation to the node i, and b=the time difference between the two clocks at the time $t_{i,B1}$, thereby enabling conversion of any timestamp from the node j's clock to a timestamp which would have been generated by the node i's clock, and thereby enabling conversion of any timestamp from the node i's clock to a timestamp which would have been generated by the node j's clock, whereby the two nodes of the set of receivers are synchronized with one another, as indicated by block 606.

Still referring to FIG. 6, in the method M2, performing RBS comprises: assuming that a set of receivers comprises two nodes, the two nodes comprising a first node and a second node, wherein $t_{first\ node,A}$ denotes a time that event A occurs with respect to a clock corresponding to the first node; broadcasting N distinct messages B to the first node and the second node via a transmitting node, wherein the first node and the second node respectively record a receive time for the N distinct messages B, and whereby respective timestamps $t_{first\ node,B} = \{t_{first\ node,B1}, \ldots, t_{first\ node,BN}\}^T$ and $t_{second\ node,B} = \{t_{second\ node,B1}, \ldots, t_{second\ node,BN}\}^T$ are generated; exchanging respective timestamps $t_{first\ node,B} = \{t_{first\ node,B1}, \ldots, t_{first\ node,BN}\}^T$ and $t_{second\ node,B} = \{t_{second\ node,B1}, \ldots, t_{second\ node,BN}\}^T$ between the first node and the second node, as indicated by block 605; and performing Deming regression in relation to a node i, thereby determining a best linear fit for the expression y=mx+b, wherein $y=t_j-t_i$, $x=t_i$, m=a clock skew, thereby determining a rate change of a difference in time between a node i clock and a node j clock, as measured in relation to the node i, and wherein b=the time difference between the node i clock and the node j clock at the time $t_{i,B1}$, thereby enabling conversion of any timestamp from the node j clock to a timestamp which would have been generated by the node i clock, and thereby enabling conversion of any timestamp from the node i clock to a timestamp which would have been generated by the node j clock, whereby the two nodes of the set of receivers are synchronized with one another, as indicated by block 606.

Understood is that many additional changes in the details, materials, steps and arrangement of parts, which have been herein described and illustrated to explain the nature of the invention, may be made by those skilled in the art within the principle and scope of the invention as expressed in the appended claims.

I claim:

1. A WBAN system for real-time telemonitoring health of a subject, comprising:

an ECG sensor;

a plurality of wearable biosignal sensors comprising a plurality of ECG signals, the plurality of ECG signals providing ECG data, each sensor of the plurality of wearable biosignal sensors configured to measure a plurality of biosignals;

a plurality of ultra-low-power radios correspondingly coupled with the plurality of sensors; and a processor operable with at least one of the plurality of sensors and the plurality of radios, each radio of the plurality of radios configured to receive the plurality of biosignals from each corresponding sensor and to transmit the plurality of biosignals to a processor via a WBAN, and the processor configured to: receive the plurality of biosignals from the plurality of radios, process the plurality of biosignals via a set of executable instructions storable in relation to a nontransitory memory device, the set of executable instructions comprising an instruction for synchronizing time of the plurality of biosignals by using the broadcasted R peak reference, whereby real-time health data is providable, and transmit the real-time health data to a healthcare provider;

wherein the set of executable instructions comprises an instruction for performing an RBS, and whereby a nondeterministic latency arising from at least one of a transmitting time delay and an accessing time delay is eliminated;

wherein the instruction for performing an RBS comprises an instruction for performing RBS by using a broadcast message corresponding to an R peak reference to synchronize each receiver of a set of receivers with one another, whereby each node in the set of receivers is configured to receive the same broadcast message, and whereby each node in the set of receivers respectively experiences a nondeterministic latency arising from only at least one of a propagation time delay and a receiving time delay;

wherein the processor is configured to operate via one of:

a first system architecture, wherein the ECG sensor is configured to transmit a short flag message every time that an R peak is detected, wherein the short flag message serves as a broadcast message to all devices, excluding the ECG sensor, in the WBAN, and wherein each receiving device records the time at which such device receives the short flag message; and a second architecture, wherein the ECG sensor is configured to transmit an entire ECG data stream, wherein the entire ECG data stream serves as a broadcast message to all devices, excluding the ECG sensor, in the WBAN, and wherein each receiving device is configured to perform an R peak detection on the entire ECG data stream and to determine a time at which each R peak occurs, wherein each R peak serves as a notable timestamp point for at least its distinct shape and facile identification, and wherein a set of times at which each R peak occurs defines $t_i$.

2. The system of claim 1, wherein the broadcast message is transmittable to, and receivable by, one of a smartphone and any other device in the WBAN, wherein the broadcast message complies with at least one short-range, low-power, wireless, communication standard, wherein the at least one short-range, low-power, wireless, communication standard comprises at least one of IEEE 802.15.6 and Bluetooth®, whereby each device in the WBAN, excluding the ECG sensor, is configured to receive and process the broadcast message in an absence of additional hardware.

3. A method of fabricating a WBAN system for real-time telemonitoring health of a subject, comprising:

providing a plurality of wearable biosignal sensors, each sensor of the plurality of sensors configured to measure a plurality of biosignals;

providing a plurality of ultra-low-power radios correspondingly coupled with the plurality of sensors;

providing a processor operable with at least one of the plurality of sensors and the plurality of radios, providing the plurality of ultra-low-power radios comprising configuring each radio of the plurality of ultra-low-power radios to receive the plurality of biosignals from each corresponding sensor and to transmit the plurality of biosignals to the processor via a WBAN, wherein providing a plurality of ultra-low-power radios comprises providing the WBAN as a single-hop network, wherein any device in the WBAN is capable of directly communicating with any other device in the WBAN, wherein providing the WBAN as the single-hop network comprises providing the device as an ECG sensor, wherein the plurality of biosignals comprises a plurality of ECG signals, the plurality of ECG signals providing ECG data;

providing the processor comprising configuring the processor to: receive the plurality of biosignals from the plurality of radios, process the plurality of biosignals via a set of executable instructions storable in relation to a nontransitory memory device, the set of executable instructions comprising an instruction for synchronizing time of the plurality of biosignals by using the broadcasted R peak reference, whereby real-time health data is providable, and transmit the real-time health data to a healthcare provider, wherein providing the processor comprises configuring the processor to operate via one of:

a first system architecture, wherein the ECG sensor is configured to transmit a short flag message every time that an R peak is detected, wherein the short flag message serves as a broadcast message to all devices, excluding the ECG sensor, in the WBAN, and wherein each receiving device records the time at which such device receives the short flag message; and a second architecture, wherein the ECG sensor is configured to transmit an entire ECG data stream, wherein the entire ECG data stream serves as a broadcast message to all devices, excluding the ECG sensor, in the WBAN, and wherein each receiving device is configured to perform an R peak detection on the entire ECG data stream and to determine a time at which each R peak occurs, wherein each R peak serves as a notable timestamp point for at least its distinct shape and facile identification, and wherein a set of times at which each R peak occurs defines $t_i$.

4. The method of claim 3, wherein the broadcast message is transmittable to, and receivable by, one of a smartphone and any other device in the WBAN, wherein the broadcast message complies with at least one short-range, low-power, wireless, communication standard, wherein the at least one short-range, low-power, wireless, communication standard comprises at least one of IEEE 802.15.6 and Bluetooth®, whereby each device in the WBAN, excluding the ECG sensor, is configured to receive and process the broadcast message in an absence of additional hardware.

5. A method of real-time telemonitoring health of a subject by way of a WBAN system, comprising:

providing the WBAN system, comprising:

providing a plurality of wearable biosignal sensors, each sensor of the plurality of sensors configured to measure a plurality of biosignals;

providing a plurality of ultra-low-power radios correspondingly coupled with the plurality of sensors; and providing a processor operable with at least one of the plurality of sensors and the plurality of radios;

providing the plurality of ultra-low-power radios comprising configuring each radio of the plurality of ultra-low-power radios to receive the plurality of biosignals from each corresponding sensor and to transmit the plurality of biosignals to the processor via a WBAN, and providing the processor comprising configuring the processor to: receive the plurality of biosignals from the plurality of radios, process the plurality of biosignals via a set of executable instructions storable in relation to a nontransitory memory device, the set of executable instructions comprising an instruction for synchronizing time of the plurality of biosignals by using the broadcasted R peak reference, whereby real-time health data is providable, and transmit the real-time health data to a healthcare provider;

performing RBS using a broadcast message, corresponding to an R peak reference, to synchronize each receiver of a set of receivers with one another, whereby each node in the set of receivers is configured to receive the same broadcast message, and whereby each node in the set of receivers respectively experiences only nondeterministic latencies from only propagation time delay and receiving time delay, wherein performing RBS comprises:

assuming that a set of receivers comprises two nodes, the two nodes comprising a first node and a second node, wherein $t_{first\ node,A}$ denotes a time that event A occurs with respect to a clock corresponding to the first node; broadcasting N distinct messages B to the first node and the second node via a transmitting node, wherein the first node and the second node respectively record a receive time for the N distinct messages B, and whereby respective timestamps $t_{first\ node,B} = \{t_{first\ node,B1}, \ldots, t_{first\ node,BN}\}^T$ and $t_{second\ node,B} = \{t_{second\ node,B1}, \ldots, t_{second\ node,BN}\}^T$ are generated;

exchanging respective timestamps $t_{first\ node,B} = \{t_{first\ node,B1}, \ldots, t_{first\ node,BN}\}^T$ and $t_{second\ node,B} = \{t_{second\ node,B1}, \ldots, t_{second\ node,BN}\}^T$ between the first node and the second node; and performing a least-squares regression in relation to the node i, thereby determining a best linear fit for an expression y=mx+b, wherein $y=t_j-t_i$, $x=t_i$, m=a clock skew, thereby determining a rate change of a difference in time between a node i clock and a node j clock, as measured in relation to the node i, and wherein b=a time difference between the node i clock and the node j clock at a time $t_{i,B1}$, thereby enabling conversion of any timestamp from the node j clock to a timestamp which would have been generated by the node i clock, and thereby enabling conversion of any timestamp from the node i clock to a timestamp which would have been generated by the node j clock, whereby the two nodes of the set of receivers are synchronized with one another.

6. A method of real-time telemonitoring health of a subject by way of a WBAN system, comprising:
providing the WBAN system, comprising:
providing a plurality of wearable biosignal sensors, each sensor of the plurality of sensors configured to measure a plurality of biosignals;
providing a plurality of ultra-low-power radios correspondingly coupled with the plurality of sensors; and
providing a processor operable with at least one of the plurality of sensors and the plurality of radios;
providing the plurality of ultra-low-power radios comprising configuring each radio of the plurality of ultra-low-power radios to receive the plurality of biosignals from each corresponding sensor and to transmit the plurality of biosignals to the processor via a WBAN, and
providing the processor comprising configuring the processor to: receive the plurality of biosignals from the plurality of radios, process the plurality of biosignals via a set of executable instructions storable in relation to a nontransitory memory device, the set of executable instructions comprising an instruction for synchronizing time of the plurality of biosignals by using the broadcasted R peak reference, whereby real-time health data is providable, and transmit the real-time health data to a healthcare provider;
performing RBS using a broadcast message, corresponding to an R peak reference, to synchronize each receiver of a set of receivers with one another, whereby each node in the set of receivers is configured to receive the same broadcast message, and whereby each node in the set of receivers respectively experiences only nondeterministic latencies from only propagation time delay and receiving time delay, wherein performing RBS comprises:
assuming that a set of receivers comprises two nodes, the two nodes comprising a first node and a second node, wherein $t_{first\ node,A}$ denotes a time that event A occurs with respect to a clock corresponding to the first node; broadcasting N distinct messages B to the first node and the second node via a transmitting node, wherein the first node and the second node respectively record a receive time for the N distinct messages B, and whereby respective timestamps $t_{first\ node,B} = \{t_{first\ node,B1}, \ldots, t_{first\ node,BN}\}^T$ and $t_{second\ node,B} = \{t_{second\ node,B1}, \ldots, t_{second\ node,BN}\}^T$ are generated;
exchanging respective timestamps $t_{first\ node,B} = \{t_{first\ node,B1}, \ldots, t_{first\ node,BN}\}^T$ and $t_{second\ node,B} = \{t_{second\ node,B1}, \ldots, t_{second\ node,BN}\}^T$ between the first node and the second node; and
performing Deming regression in relation to a node i, thereby determining a best linear fit for an expression y=mx+b, wherein $y=t_j-t_i$, $x=t_i$, m=a clock skew, thereby determining a rate change of a difference in time between a node i clock and a node j clock, as measured in relation to the node i, and wherein b=the time difference between the node i clock and the node j clock at the time $t_{i,B1}$, thereby enabling conversion of any timestamp from the node j clock to a timestamp which would have been generated by the node i clock, and thereby enabling conversion of any timestamp from the node i clock to a timestamp which would have been generated by the node j clock, whereby the two nodes of the set of receivers are synchronized with one another.

\* \* \* \* \*